April 8, 1930.  E. STEVENS  1,753,483
BUMPER STRUCTURE
Filed May 27, 1929  2 Sheets-Sheet 1

Inventor
EVIE STEVENS
By Reynolds & Reynolds
Attorney

April 8, 1930. E. STEVENS 1,753,483
BUMPER STRUCTURE
Filed May 27, 1929 2 Sheets-Sheet 2
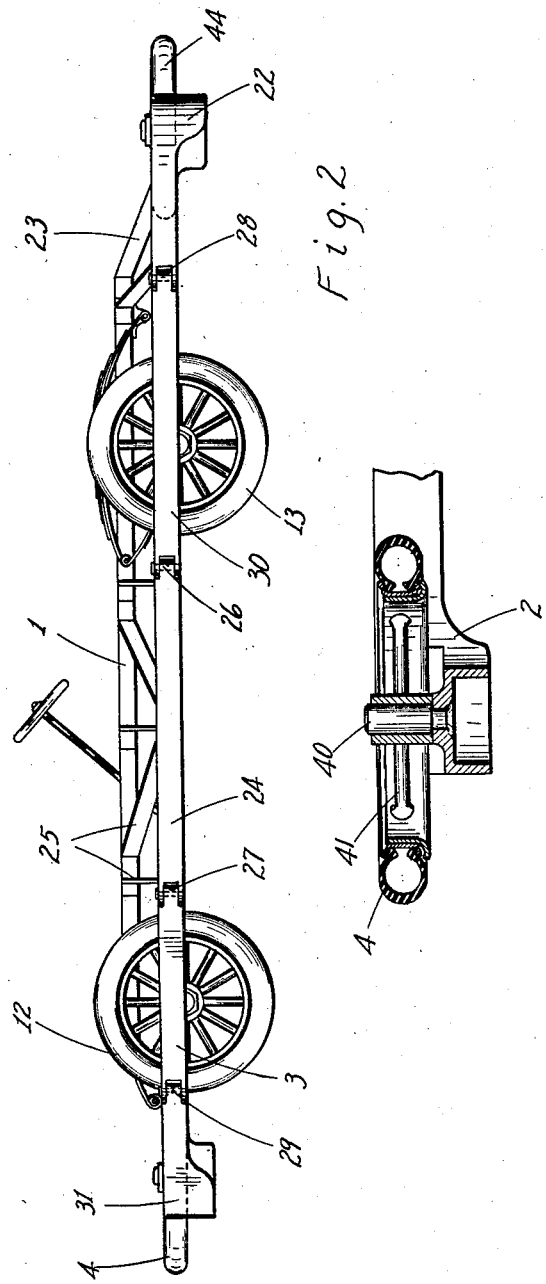
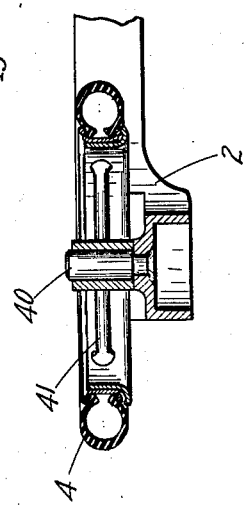
Inventor
EVIE STEVENS
By Reynolds & Reynolds
Attorney Patented Apr. 8, 1930

1,753,483

UNITED STATES PATENT OFFICE

EVIE STEVENS, OF LOS ANGELES, CALIFORNIA

BUMPER STRUCTURE

Application filed May 27, 1929. Serial No. 366,228.

My invention relates to automobiles, and has for its particular object the provision of a bumper structure which will more effectively protect the occupants of the automobile from injury due to collision with a moving or stationary body, than devices now in use, and which will to a considerable extent avoid excessive damage to the automobile.

In particular, it is an object of my invention to provide a bumper structure for automobiles, whereby, in the event of collision, the automobile will be sheared off to one side or the other, with the result that it will seldom strike another object squarely and stop short, thus avoiding the jolt which is so injurious to the vehicle and to the occupants. In such a case, while the vehicle itself might be somewhat strained or injured, depending upon the severity of the shock, the chances of serious injury to the occupants would be materially lessened by the employment of my device.

More specifically, it is an object of my invention to provide a bumper structure including a front member, and usually a rear member, in which is incorporated a resilient rotatable member, such, for instance, as a spare tire, mounted upon a horizontal axis, and rotatable upon being struck to deflect the vehicle to one side or the other, and to cause it to be sheared off by the rearwardly sloping portions of the rigidly mounted bumper structure.

By rigid mounting it is to be understood that the bumper structure is more or less rigidly connected to the vehicle, as distinguished from a resilient mounting, wherein the mounting itself is intended to yield and take up minor shocks. There may be some yielding in the bumper structure as installed, but it should be sufficiently rigidly mounted that shocks to the bumper structure will be communicated more or less directly to the chassis of the automobile. It is intended that this device shall be sufficiently strong, and so mounted and arranged, that even a collision with a telephone pole, unless directly head-on, will not severely injure the occupants of the car or damage the car itself.

My invention comprises the novel parts and the novel combination and arrangement thereof, as shown in the accompanying drawigs, described in the specification, and particularly defined by the claims terminating the same.

In the accompanying drawings I have shown my invention, associated with an automobile, in a form which is now preferred by me.

Figure 2 is a side elevation of the front portion of an automobile, showing my bumper structure assembled thereon.

Figure 3 is a section on line 3—3 of Figure 1.

Figure 1:
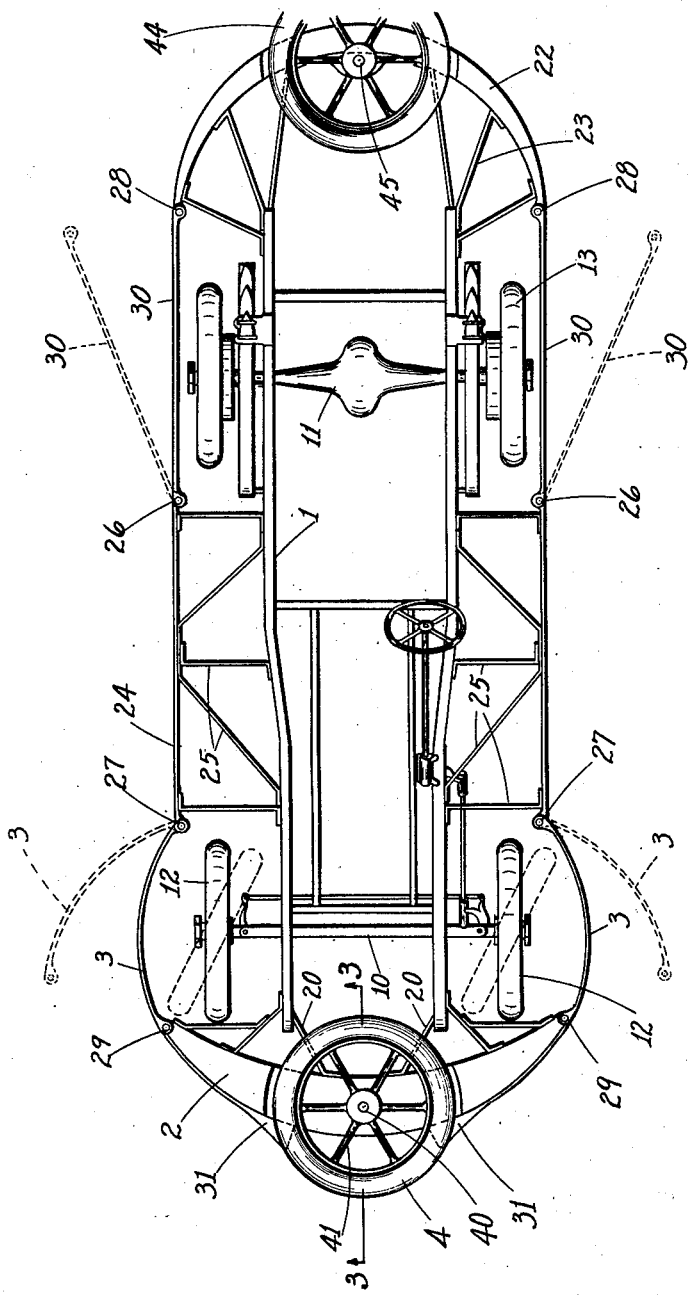
Figure 1 is a plan view of an automobile chassis showing my bumper structure mounted thereon.

The details of the automobile, in themselves, form no part of my invention, it being necessary, only, to note that the chassis 1 is supported upon the usual front axle 10 and rear axle 11, which in turn are supported upon the front wheels 12 and the rear wheels 13.

Upon the front end of the vehicle is supported a front bumper member 2. The exact manner of support of this is to a considerable extent immaterial, and various bracket arms 20 have been shown for the purpose, these extending from the chassis 1 to the front bumper member 2. This bumper member 2 extends from side to side of the vehicle, and is shown as curved, as seen in plan view, so that it slopes rearwardly from a central point. It is made of any suitable material, as for instance cast steel, and its cross-section may be such as to insure the maximum of strength, and if desired it may be so formed or ornamented as to enhance the appearance of the car. A similar bumper member 22, supported upon brackets 23, may project rearwardly from the chassis.

Connecting the front bumper member 2 and the rear bumper member 22, I prefer to provide a continuous series of bumper members, illustrated by the side members 24 supported at the outer margin of the running board, with brackets 25 supporting them from the chassis 1, and the gate members 3 and 30. These gate members are integral parts of the bumper structure, but are positioned in front of each of the wheels, that is, just outside of the wheels, and are preferably hinged, as at 26 and 27, so that they may be swung aside to permit changing a tire. Normally they are bolted, or otherwise secured, to the bumper members, as indicated at 28 and 29, respectively. The member 3 is shown as provided with a forward projection 31, which extends in front of the bumper member 2 at either side, to a junction with a tire 4, the purpose of which will now be explained.

Since every car normally carries a spare tire, it will be found convenient to utilize it as part of the bumper structure, though special members may be used in the same way. The tire 4 represents a resilient member which is supported upon a vertical axis 40 to rotate when struck, unless that blow be precisely along the center line of the vehicle. Such a blow will be in effect a glancing blow, and this glancing effect will be emphasized by the rotation of the tire 4 set up thereby, and this will cause the vehicle, and the object struck, also, if it be not immovable, to be deflected, one to one side, and the other to the other side, and to engage along the inclined side of the bumper member 2, so that they will shear off one from the other. While this causes a somewhat abrupt lateral displacement of the vehicle, it does not produce nearly the shock of a head-on collision, and the likelihood of damage is considerably lessened. The tire 4 may be mounted upon a wheel, or upon a carrier, indicated at 41, which is rotatably mounted upon the vertical shaft 40. This shaft may be supported in any suitable manner, as from the front bumper member 2. A similar bumper tire may be carried at the rear, as is indicated at 44, this being mounted upon a corresponding vertical shaft 45.

All parts of the bumper structure are preferably at about the same level, so that should two automobiles similarly equipped come together the two bumper members will strike each other first, and tend to prevent further damage. The side members 24 and the forward gate 3, which must be bowed outwardly to give room for the turning of the front wheels 12, serve to prevent damage to the fenders of cars, which are frequently damaged by contact, and this is particularly true of the front fenders, which are the better protected by the outwardly bowed gates 3, thus permitting the squeezing of cars more closely together when parking parallel to each other.

What I claim as my invention is:

1. In combination with the chassis of an automobile, a non-resilient bumper member supported rigidly from the chassis and sloping rearwardly from each side of a central point to a point outside of the wheels, and a circular member resilient per se supported upon a vertical axis, of said bumper member, with its forward periphery in advance of the forward, central point of said front member.

2. The combination of claim 1, said resilient circular member comprising a tire mounted upon the front bumper member to turn, when struck, to deflect the blow to one side or the other of the front bumper member.

3. In combination with the chassis of an automobile, a bumper structure supported therefrom and presenting a continuous bumper entirely about the automobile at about the level of the chassis, and including gates removably secured in front of the several wheels, and means at the front of the car for mounting a tire on a horizontal axis, with its periphery projecting beyond the front of the bumper structure, the bumper structure sloping rearwardly from each side of the tire, and the latter being rotatable when struck, to deflect the blow to the bumper structure proper.

4. The combination of claim 3, said gates positioned opposite the front wheels being bowed outwardly to allow the front wheels of the automobile to turn freely.

Signed at Seattle, Washington, this 17th day of May, 1929.

EVIE STEVENS.